United States Patent [19]

Berry et al.

[11] Patent Number: 5,342,109

[45] Date of Patent: Aug. 30, 1994

[54] SEAT HAVING LIFE JACKET CONTAINED THEREIN

[75] Inventors: David L. Berry; J. Edward Johnson; Marshall J. Aggen, all of Marysville, Wash.

[73] Assignee: Turnbull, Inc., Marysville, Wash.

[21] Appl. No.: 100,378

[22] Filed: Aug. 2, 1993

[51] Int. Cl.$^5$ .............................................. A47C 7/62
[52] U.S. Cl. ..................................... 297/191; 297/190; 297/217
[58] Field of Search ............... 297/190, 191, 194, 188, 297/217, 218, DIG. 1, DIG. 6, 452.29, 452.33, 452.34, 452.35; 441/126, 127; 244/122 R

[56] References Cited

U.S. PATENT DOCUMENTS

| | | | |
|---|---|---|---|
| 802,275 | 10/1905 | Fentrick . | |
| 2,257,103 | 9/1941 | Brokering | 441/126 X |
| 2,294,039 | 8/1942 | Looney | 297/191 |
| 2,429,050 | 10/1947 | Decker | 297/190 |
| 3,167,794 | 2/1965 | Brown . | |
| 3,516,098 | 6/1970 | O'Link . | |
| 3,903,554 | 9/1975 | Dodd | 441/126 |
| 4,191,420 | 3/1980 | Fasset et al. | 297/194 |
| 4,306,748 | 12/1981 | Sullivan | 297/217 X |
| 4,619,623 | 10/1986 | Elverskog | 441/126 |
| 5,213,392 | 5/1993 | Bostrom et al. | 297/191 X |

Primary Examiner—Kenneth J. Dorner
Assistant Examiner—Milton Nelson, Jr.
Attorney, Agent, or Firm—Harrison & Egbert

[57] ABSTRACT

A life preserver-containing seat having a seat with a seat back and a seat bottom, a life jacket fitted within a cavity formed in the seat back, and a covering material having one edge joined to the seat back and extending across the life jacket. The covering material has another edge removably affixed to the seat back so as to expose the life Jacket beneath the covering material. The seat has a frame with a foam material received therewithin. The cavity is formed in the foam material. A hook-and-loop material extends around at least a portion of the periphery of the seat cavity. The covering material has a complementary hook-and-loop material removably engaging the material around the cavity. A foam insert is removably received within a central hole formed in the life jacket.

18 Claims, 2 Drawing Sheets

SEAT HAVING LIFE JACKET CONTAINED THEREIN

TECHNICAL FIELD

The present invention relates to chairs and seats in general. More particularly, the present invention relates to stowage techniques for life jackets in transit vehicles.

BACKGROUND ART

In virtually all water-borne vehicles, it is necessary to carry an adequate supply of life preservers and life jackets for the safety of the crew and any passengers thereaboard. A common problem that often occurs with the stowage of life preservers and life jackets is the optimal usage of space aboard the boat. In many circumstances, the life jackets are simply piled into a box positioned in one location on board the boat or ship. In other circumstances, the life preservers are simply placed in a pile in a deep recess of the boat. Often, such piles of life jackets are inaccessible to those most in need of the life jackets in an emergency situation.

In many boats, the passenger seats are arranged in a fashion similar to that found in airplanes. There are often found rows of seats within a central area of the boat. These seats accommodate passengers during the course of the voyage. In many circumstances, where the travel is of short duration, the passengers are assigned to a seat and generally do not leave the seat during the transit period. These arrangements of seats are often found on ferryboats.

In the course of short duration travel, it is virtually impossible for the boat operators to properly inform the passengers of the location of the life preservers, how to access the life preservers, and how to properly use the life preservers. The accumulation of a large number of life preservers on board the boat is simply a matter of complying with safety requirements. It is extremely unrealistic to expect the boat operator to properly inform the passengers of the safety requirements in the case of emergencies. As a result, if an emergency should occur, the passengers are often in a panic or otherwise unable to properly locate the necessary life jackets.

Another problem associated with the improper stowage of life jackets is that the limited space on board the boat is inefficiently utilized. The space utilized for the accumulation of the large number of life preservers could othewise be used for the storage of luggage, tools, food, or other useful materials. As such, present storage techniques for life jackets promote an inefficient use of space on the boat.

It is an object of the present invention to provide a seat that includes a proper space for the receipt of a life jacket.

It is another object of the present invention to provide a seat which maximizes the storage capabilities of the water-borne vehicle.

It is a further object of the present invention to provide a seat which places a life preserver within easy access by the passenger residing in the seat.

It is still a further object of the present invention to provide a life jacket retaining seat which is easy to manufacture, relatively inexpensive, and comfortable.

These and other objects and advantages of the present invention will become apparent from a reading of the attached specification and appended claims.

SUMMARY OF THE INVENTION

The present invention is an apparatus that comprises a seat having a seat back and a bottom, a life jacket fitted within a cavity formed in the seat back, and a covering material with a flap having one edge joined to the seat back and extending across the life jacket. The flap has another edge which is removably affixed to the seat back so as to allow access to the life jacket within the seat back.

The seat is made of a frame. The frame has a foam material received therewithin. The cavity is formed within the foam material. Specifically, the frame of the seat has a generally flat backing plate. The foam extends outwardly from this backing plate. The foam material has a generally U-shaped configuration so as to define the cavity in the seat back.

The seat back has a fabric covering. The covering material is of a similar quality as the fabric covering of the seat back. The seat back includes a hook-and-loop material extending around a portion of the periphery of the cavity. The covering material includes a complementary hook-and-loop material extending around an edge of the flap corresponding to the hook-and-loop material of the seat back. The hook-and-loop material of the seat back engages the complementary hook-and-loop material of the covering material.

The covering material includes a flap that has one edge positioned adjacent a top of the cavity. The hook-and-loop material extends around the remaining periphery of the cavity at the surface of the seat back.

The life jacket extends outwardly so as to have a thickness generally corresponding to the thickness of the foam material of the seat back. The life jacket includes a central hole formed therein. This central hole is positioned so as to extend around the neck of the user. A foam insert is removably received within the central hole. The foam insert is generally flush with the surface of the seat back. The foam insert extends between the covering material and the back plate of the frame.

The covering material has a foam section which is affixed to an inner surface of the covering material. The foam is interposed between the life jacket and the fabric exterior of the covering material. A headrest is affixed to the seat back and has a lower edge extending below one edge of the covering material. The seat back has a front surface and a back surface. The cavity opens to the front surface. The covering material extends over a portion of the front surface of the seat back.

DETAILED DESCRIPTION OF THE INVENTION

Figure 1:
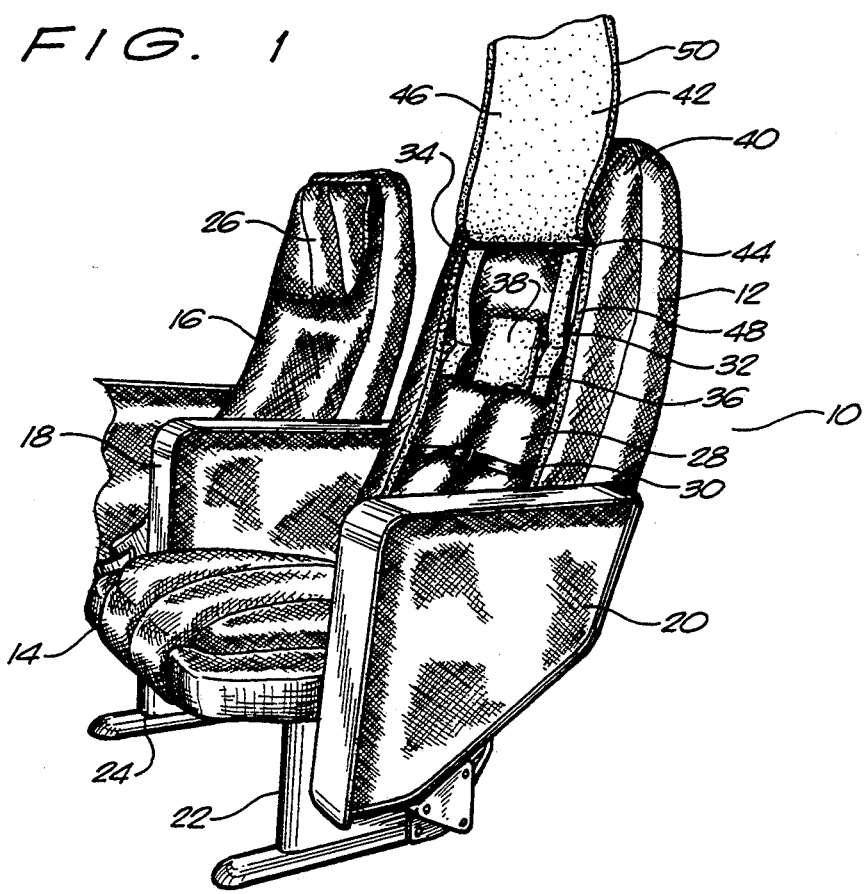
FIG. 1 is a perspective view showing the seat in accordance with the preferred embodiment of the present invention.

Referring to FIG. 1, there is shown the seat 10 in accordance with the preferred embodiment of the present invention. The seat 10 includes a seat back 12 and a seat bottom 14. An adjacent seat 16 is positioned so as to share an arm rest 18 with the seat 10 of the present invention. The seat 10 of the present invention has an exterior appearance similar to conventional seating. Specifically, the seat 10 includes arm rests 18 and 20. The seat 10 further includes legs 22 and 24 which support the seat above a surface. The seat back 12 includes a head rest 26 affixed to a frontal surface. The seat bottom 14 is appropriately padded so as to be comfortable for the use of the passenger. The present invention specifically comprises an improvement to the seat back 12.

In FIG. 1, it can be seen that the seat back 12 has a life jacket 28 fitted within a cavity formed into the seat back. The life jacket 28 has a conventional configuration. Typically, the life jacket 28 is of a type that fits around the neck of the user. The life jacket 28 has a generally rectangular configuration so as to fit snugly within the cavity formed in the seat back 12. The life jacket 28 includes a belt 30 and reflectors 32 and 34. The reflectors will appear on the top surface of the life jacket 28 so as to allow for easy visibility and possible tracking of those using the life jacket 28. Importantly, the life jacket 28 has a central hole 36 formed therein. The central hole 36 accommodates a foam insert 38. Foam insert 38 has a thickness generally corresponding to the depth of the cavity into which the life jacket 28 is fitted. The foam insert 38 has a generally rectangular configuration. The outer surface of the foam insert 38 will be generally flush with the outer surface of the life jacket 28. The insertion of the foam insert 38 keeps the surface of the seat back 12 generally flat and comfortable. In the case of an emergency, foam insert 38 can be easily removed from its position within the opening 36 of the life jacket 28.

Figure 2:
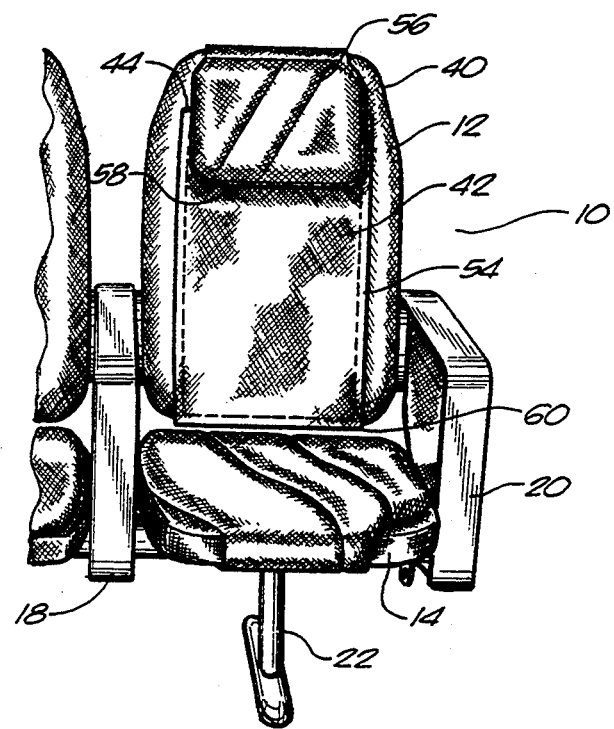
FIG. 2 is a frontal view of a seat in accordance with the preferred embodiment of the present invention.

In FIG. 1, it can be seen that a covering material 40 is provided which extends around the frame of the seat back 12. The covering material 40 includes a flap 42 that has one edge 44 joined to the seat back. Essentially, the flap 42 is sewn at 44 to the seat back 12. This allows the flap 42 to move between the position shown in FIG. 1 and the position which covers the life jacket 28 (as illustrated in FIG. 2). The flap 42 of the covering material 40 has a foam section 46 affixed to an inner surface thereof. In the normally closed position, the foam section 46 will be interposed between the life jacket 28 and the fabric exterior of the covering material 40. The foam material 46 is further used to add comfort to the seat back 12 and to cushion the passenger from any uncomfortable protrusions from the life jacket 28.

As can be seen in FIG. 1, a strip 48 of hook-and-loop material extends around a portion of the periphery of the cavity which contains the life jacket 28. As will be described hereinafter, this hook-and-loop material strip 48 has a generally U-shaped configuration. The hook-and-loop material strip 48 serves to receive a complementary hook-and-loop material strip 50 formed around the periphery of the flap 42 of the covering material 40. As such, in normal use, the hook-and-loop material strip 48 will engage the complementary hook-and-loop material strip 50 of the flap 42 so as to properly close the flap 42 over the life jacket 28 on the seat back 12.

FIG. 2 shows the seat 10 of the present invention from the frontal view. Specifically, the seat 10 includes a seat back 12, a seat bottom 14, and armrests 18 and 20. Seat leg 22 is used to support the seat 10 above an exterior surface.

In FIG. 2, it can be seen that the seat back 12 includes the covering material 40 extending around the frame of the seat back 12. The flap 42 is illustrated in its proper and normal position extending over the life jacket 28. It can be seen that the flap 42 has its peripheral edge 54 engaging the hook-and-loop material extending around the cavity. The flap 42 is securely affixed to the fabric of the seat back 12. In normal use, the appearance of the seat back 12, and the flap 42 of the covering material 40 will have a rather conventional appearance. A headrest 56 is provided adjacent to the top edge of the seat back 12. The headrest is affixed to the seat back 12 and has a lower edge 58 which extends over the edge 44 used to join the flap 42 to the seat back 12. As such, one seam of the flap of the covering material 40 is appropriately hidden from view.

When an emergency situation should arise, the passenger in the seat 10 will grab the bottom edge 60 of the flap 42 and pull upwardly. This will cause the VELCRO (TM) strips to become separated. As the flap 42 is lifted, the interior cavity containing the life jacket 28 is exposed. The passenger can then easily pull the life jacket 28 from the cavity in the seat back 12.

Figure 3:
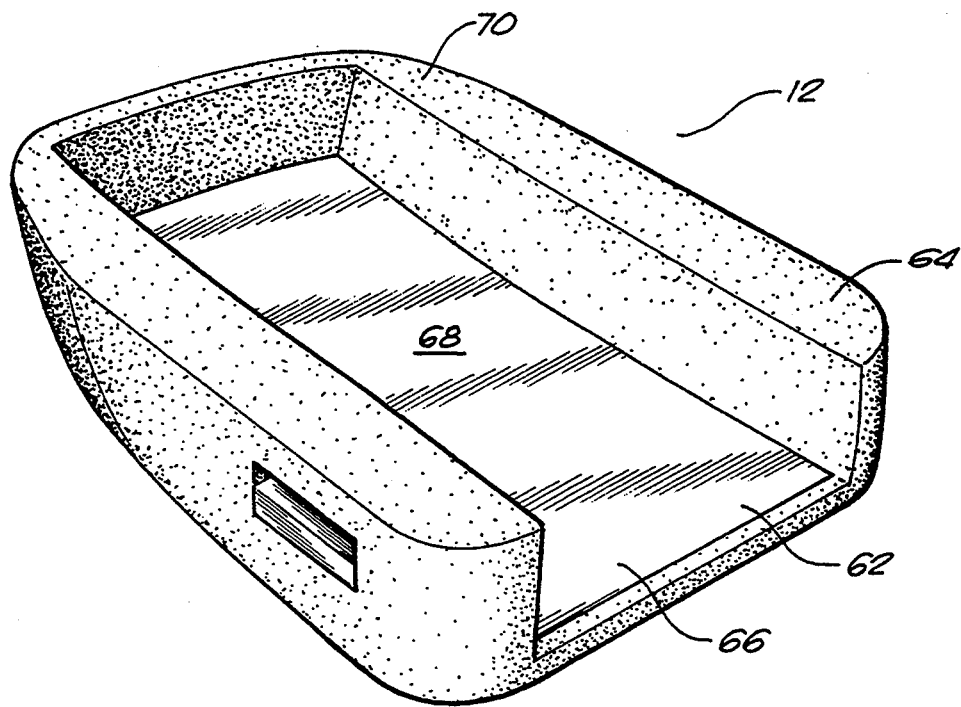
FIG. 3 is an isolated perspective view of the foam backing of the seat in accordance with the preferred embodiment of the present invention.

FIG. 3 shows an isolated view of the interior of the seat back 12. In particular, the seat back 12 includes the frame 62. The frame 62 is an aluminum frame. As can be seen, the frame 62 has a foam material 64 received therewithin. The cavity 66 is formed within the foam material 64. The frame 62 includes a generally flat backing plate 68. The foam material 64 extends outwardly from this backing plate. The foam material 64 has a generally U-shaped configuration so as to define the cavity 66 in the seat back 12. The area of the cavity 66 has a generally rectangular configuration. This rectangular configuration should have a size suitable for receiving the life jacket therewithin. The life jacket will rest against the backing plate 68 and extend outwardly so that the outer surface of the life jacket will be generally flush with the outer surface 70 of the foam material 64. The foam material 64 can be affixed to the backing plate 68 by mechanical techniques or by adhesion. The covering material will extend around the foam material 68 so as to form a seat of proper appearance.

Figure 4:
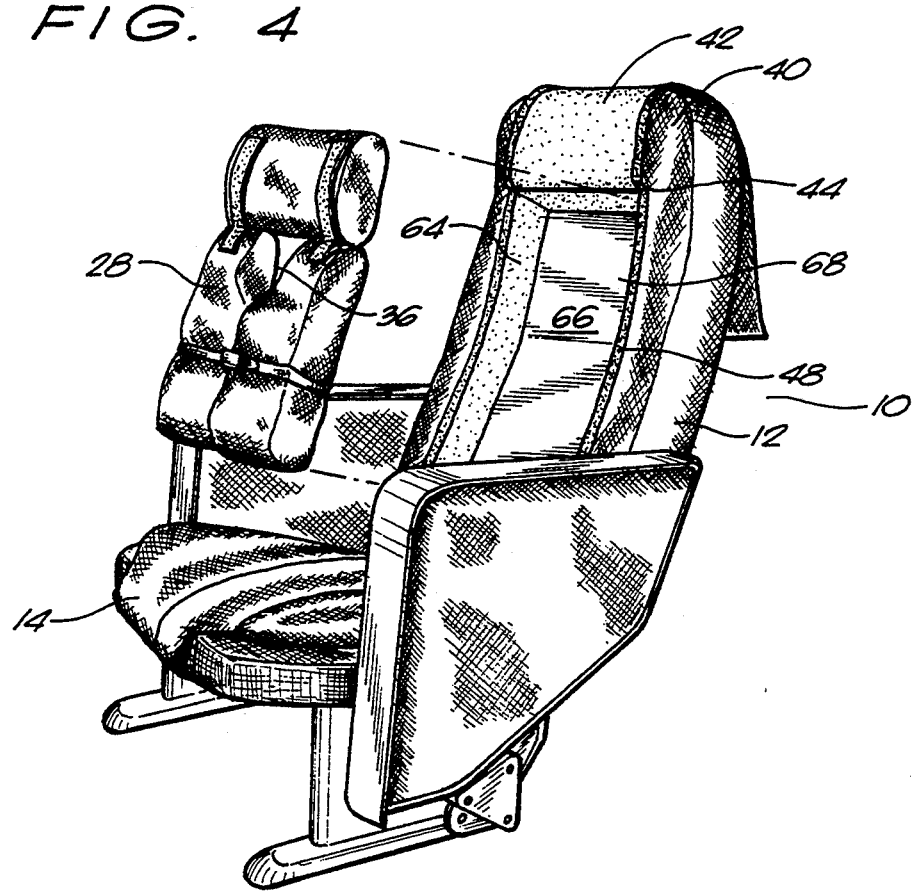
FIG. 4 is a partially exploded perspective view showing the seat in accordance with the preferred embodiment of the present invention.

In FIG. 4, an exploded view of the seat 10 is illustrated. The seat back 12 is shown as having the cavity 66 formed therein. As can be seen, the hook-and-loop material 48 extends around the periphery of the cavity 66. The backing plate 68 generally forms the back of the seat 10. The hook-and-loop material strip 48 is adjacent the front surface of the seat back 12. The flap 42 of the covering material 40 is connected at an upper seam 44. As such, the flap 42 will generally "pivot" in relation to the seam 44. The fabric of the flap 42 and the covering material 40 will be the same as the fabric which covers the seat back 12 and seat bottom 14 in general.

In FIG. 4, it can be seen that the life jacket 28 is inserted into the cavity 66 formed into the seat back 12. The life jacket 28 includes a central hole 36 for receiving the foam insert (described previously). The life jacket 28 has a generally rectangular configuration which fits the rectangular configuration of the cavity 66. The life jacket 28 is inserted in the cavity 66 such that the outer surface of the life jacket 28 is generally flush with the foam material 64. After the life jacket 28 is inserted into cavity 66, the flap 42 of the covering material 40 is pulled down over the outer surface of the life jacket 28 and the edges are fastened to the hook-and-loop material strips 48. The seat 10 is then in a proper condition for use during conventional and during emergency conditions.

The seat 10 of the present invention greatly facilitates the operation of water-borne vehicles. Any seats contained within the vehicles can now properly accommodate a life jacket therein. This not only makes the life jacket accessible by the passenger, but also properly stows the life jacket so as to avoid unnecessary and inefficient use of space elsewhere in the vehicle. Unexpectedly, it was found that the material of the life jacket 28 did not detract from the comfort of the seat back 12 during normal use. Very few persons will realize the difference between the seat back 12 of seat 10 and conventional seat backs. Some persons will consider the seat back 12 to be more comfortable with the life jacket 28 included therein. As a result of the present invention, the safety of passengers in water-borne vehicles is greatly improved. In emergency conditions, it is only necessary for the passenger to grab the edge of the flap of the covering material, to pull up, and to expose the life jacket within the cavity of the seat back. The life jacket can then be easily removed.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

We claim:

1. An apparatus comprising:
   a seat having a seat back and a seat bottom, said seat back having a cavity formed therein, said seat having a metallic frame, said frame having a foam material received therewithin, said cavity formed in said foam material;
   a life jacket fitted within said cavity of said seat back; and
   a covering material having one edge joined to said seat back, said covering material extending across said life jacket, said covering material having another edge removably affixed to said seat back.

2. The apparatus of claim 1, said seat back having a fabric covering, said covering material having a flap of a material of a similar quality as said fabric covering.

3. The apparatus of claim 1, said life jacket having central hole formed therein, said apparatus further comprising:
   a foam insert removably received within said central hole, said foam insert being generally flush with a surface of said seat back.

4. The apparatus of claim 1, said seat back having a generally flat backing plate, said foam material extending outwardly from said backing plate.

5. The apparatus of claim 3, said foam material having a generally U-shaped configuration so as to define said cavity in said seat back.

6. The apparatus of claim 1, said seat back having a hook-and-loop material extending around a portion of a periphery of said cavity, said covering material having a complementary hook-and-loop material extending along said another edge, said hook-and-loop material of said seat back engaging said complementary hook-and-loop material of said covering material.

7. The apparatus of claim 6, said one edge of said covering material positioned adjacent a top of said cavity, said hook-and-loop material extending around said cavity at said surface of said seat back.

8. An apparatus comprising:
   a seat having a seat back and a seat bottom, said seat back having a cavity formed therein;
   a life jacket fitted within said cavity of said seat back; and
   a covering material having one edge joined to said seat back, said covering material extending across said life jacket, said covering material having another edge removably affixed to said seat back, said covering material having a foam section affixed to an inner surface thereof, said foam section interposed between said life jacket and an outer surface of said covering material.

9. The apparatus of claim 1, further comprising:
   a head rest affixed to said seat back and having a lower edge extending below said one edge of said covering material.

10. An apparatus comprising:
    a seat having a seat back and a seat bottom, said seat back having a cavity formed therein;
    a life jacket fitted within said cavity of said seat back; and
    a covering material having one edge joined to said seat back, said covering material extending across said life jacket, said covering material having another edge removably affixed to said seat back, said seat back having a front surface and a back surface, said cavity extending into said front surface, said covering material extending over a portion of said front surface, said life jacket having an outer surface generally flush with said front surface of said seat back.

11. A seat comprising:
    a frame;
    a foam material affixed to said frame, said foam material having a cavity formed therein, said cavity having an area with a sufficient size so as to receive a life jacket therein;
    a covering material extending over said frame and said foam material, said covering material having a flap extending over said cavity in said foam material, said flap having an edge removably affixed to said covering material; and
    a life jacket fitted within said cavity of said foam material.

12. The seat of claim 11, said life jacket having a surface generally flush with a surface of said foam material.

13. The seat of claim 12, said flap having a cushioning material affixed to an inner surface thereof, said cushioning material interposed between said flap and said life jacket.

14. The seat of claim 12, said life jacket having a central hole formed therein, said seat further comprising:
    a foam insert removably received within said central hole of said life jacket, said foam insert having a thickness generally equal to a thickness of said foam material.

15. The seat of claim 12, said covering material having an edge extending around a periphery of said cavity, said edge having a fastener affixed thereto, said edge of said covering material for removably receiving an edge of said flap.

16. The seat of claim 15, said edge of said covering material having said fastener extending therearound, said fastener being a hook-and-loop material, said flap having a complementary hook-and-loop material removably engaging said hook-and-loop material of said covering material.

17. A seat comprising;
a frame;
a foam material affixed to said frame, said foam material having a cavity formed therein, said cavity having an area with a sufficient size so as to receive a life jacket therein;
a covering material extending over said frame and said foam material, said covering material having a flap extending over said cavity in said foam material, said flap having an edge removably affixed to said covering material, said frame comprising;
a metallic plate positioned at a rear surface of the seat, said foam material extending toward a front surface of the seat, said cavity opening to said front surface.

18. The seat of claim 17, said covering material being a fabric extending around said frame, said flap being of a similar material as said fabric.

* * * * *